United States Patent [19]

Kristofek

[11] Patent Number: 4,609,979

[45] Date of Patent: Sep. 2, 1986

[54] SWIVEL ASSEMBLY

[75] Inventor: Paul Kristofek, Hickory Hills, Ill.

[73] Assignee: Cooper Industries, Inc., Houston, Tex.

[21] Appl. No.: 715,679

[22] Filed: Mar. 25, 1985

[51] Int. Cl.[4] .......... F21S 1/02; F16C 11/00

[52] U.S. Cl. .......... 362/427; 403/117

[58] Field of Search .......... 362/427; 403/113, 117

[56] References Cited

U.S. PATENT DOCUMENTS

| | | | |
|---|---|---|---|
| 2,170,201 | 8/1939 | Knapp | 403/117 X |
| 2,826,440 | 3/1958 | Robboy | 403/113 |
| 3,030,128 | 4/1962 | Versen | 403/113 X |
| 4,494,177 | 1/1985 | Matthews | 362/427 X |

FOREIGN PATENT DOCUMENTS

| | | | |
|---|---|---|---|
| 333122 | 2/1921 | Fed. Rep. of Germany | 362/427 |
| 941448 | 1/1949 | France | 362/427 |
| 1301608 | 12/1964 | France | 362/427 |
| 687998 | 3/1965 | Italy | 362/427 |

*Primary Examiner*—Tony M. Argenbright
*Attorney, Agent, or Firm*—Donald J. Breh; Eddie E. Scott; Alan R. Thiele

[57] ABSTRACT

A swivel assembly, particularly adapted to mount a light fixture to a track of a track lighting system is disclosed. The swivel assembly includes a hollow housing comprising a body section having a peripheral sidewall defining a semi-circular shaped closed end, an opposing open end and an open side. A circular cup-shaped cap having an open side is rotatably journaled over the open side of the body at the semi-circular end and a removeable cover is mounted over a portion of the open side of the body adjacent to the cap. The body, cover and cap form the hollow housing. A transverse mounting wall having an access hole to the interior of the housing is provided at one end of the housing. The transverse wall is adapted to mount the swivel to an external mounting member. Means for mounting the swivel to a light fixture and including a second access opening into the interior of the housing is provided on the cap portion.

19 Claims, 13 Drawing Figures

SWIVEL ASSEMBLY

BACKGROUND OF THE INVENTION

This invention relates to an attachment device. More particularly, the invention relates to a swivel attachment. In still greater particularity, the invention relates to a swivel attachment for use with a lighting fixture of the type used in a track lighting system.

While not limited thereto, the present invention is particularly adapted for use in attaching a track lighting fixture to the track of the system. Track lighting systems typically employ an array of electrical track fastened to a surface, such as a ceiling, with various designs of lighting fixtures mechanically and electrically connected to the track. Typically the attachment of the fixture to the track is through an attachment providing for pivotable and/or rotational movement of the fixture so that specific objects or areas can be illuminated as desired.

The pivotable attachment must provide for easy repositioning of the fixture and positive retention of the fixture at selected angular positions relative to the mounting surface. Preferably, the attachment should function as an enclosure and a conduit for the appropriate electrical leads which extend between the track and fixture. Also, the attachment should be esthetically attractive and employ a minimum of parts.

Heretofore, mounting arrangements have employed knuckles, pin-in-hole designs and formed L- or U-shaped straps with the fixture pivotably mounted to the free ends of the strap. While these arrangements have been effective, they have certain shortcomings including, among others, the requirement that the electrical leads be routed externally of the mounting fixture, relatively large and bulky configurations, high cost to manufacture and poor retention of the fixture after being positioned in a desired orientation.

SUMMARY OF THE INVENTION

Accordingly, it is an object of the present invention to provide an attachment swivel adapted for use in a track lighting system.

Another important object of the invention is to provide for a swivel attachment that provides for pivotable positioning of the lighting fixture as well as complete enclosure of the electrical leads within the swivel.

A further object of the invention is to provide for a swivel attachment that is compact and takes up a minimum of space.

A still further object of the invention is to provide for a swivel attachment that is versatile and can be used to mount a variety of devices other than lighting fixtures to external mounting surfaces, if desired.

According to a preferred aspect of the invention, the swivel includes a hollow body section open on one side having a circular cup shaped cap rotatably journaled over the open side of the body providing for pivotable movement between the cap and body.

Another important aspect of the invention provides means for releasably retaining the cap to the body at selected positions so that the fixture can be repositioned and retained at alternative angular positions relative to the mounting member to which the swivel is affixed.

According to another important feature of the invention, a cover is removeably attached to the body section over the open side adjacent the cap defining a hollow interior.

Another feature of the invention provides for a transverse wall across one end of the body section having an access hole for passage of electrical leads into the interior of the swivel. The transverse wall is also provided with means, in the form of a pair of clearance holes, for being attached to the track or other external mounting member with a pair of threaded fasteners engaged within the clearance holes.

A still further important feature of the invention provides for an externally threaded hollow boss on the circular cap providing for attachment of the swivel to the fixture and for passage of the electrical leads out of the housing to the fixture.

A still further important feature of the invention provides for a semi-circular bearing surface at one end of the body at the open side on which the free end of the sidewall of the circular cap pivots.

A further feature of the invention provides for a pair of stops on the body which engage the cap and limit the pivotable movement of the cap over an angular range of at least 90°.

BRIEF DESCRIPTION OF THE DRAWINGS

The invention will be better understood after a reading of the following detailed description taken in connection with the accompanying drawings wherein.

DETAILED DESCRIPTION OF THE PREFERRED EMBODIMENT

Figure 1:
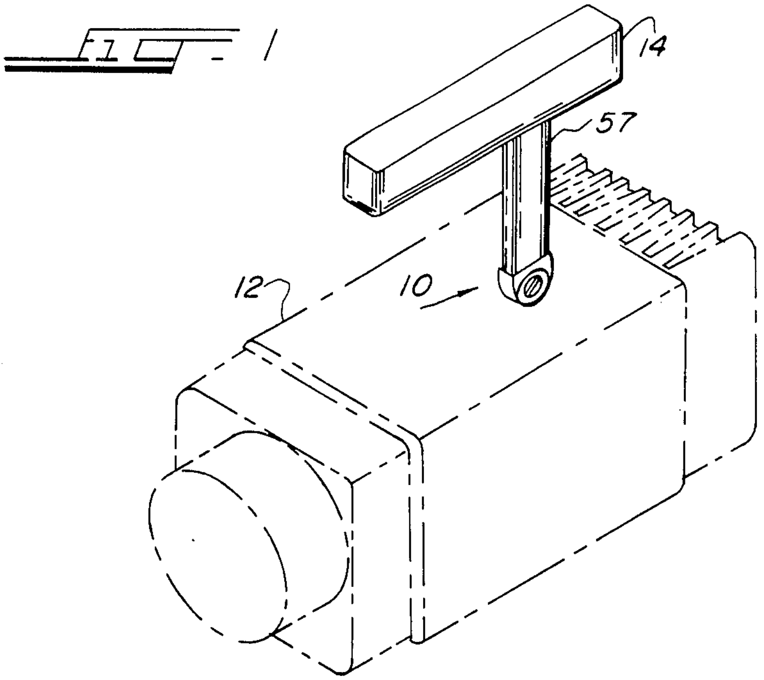
FIG. 1 is a perspective view of a track lighting fixture attached to the track of a track lighting system with a swivel employing the principles of the present invention.
Figure 2:
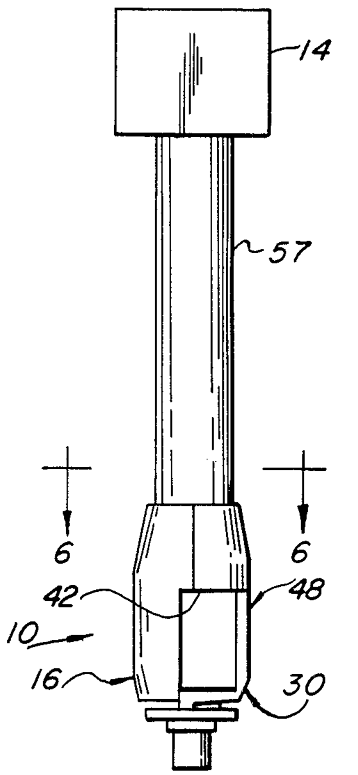
FIG. 2 is a side elevational view of the swivel of the present invention attached to a hollow mounting stem showing details of construction.
Figure 6:
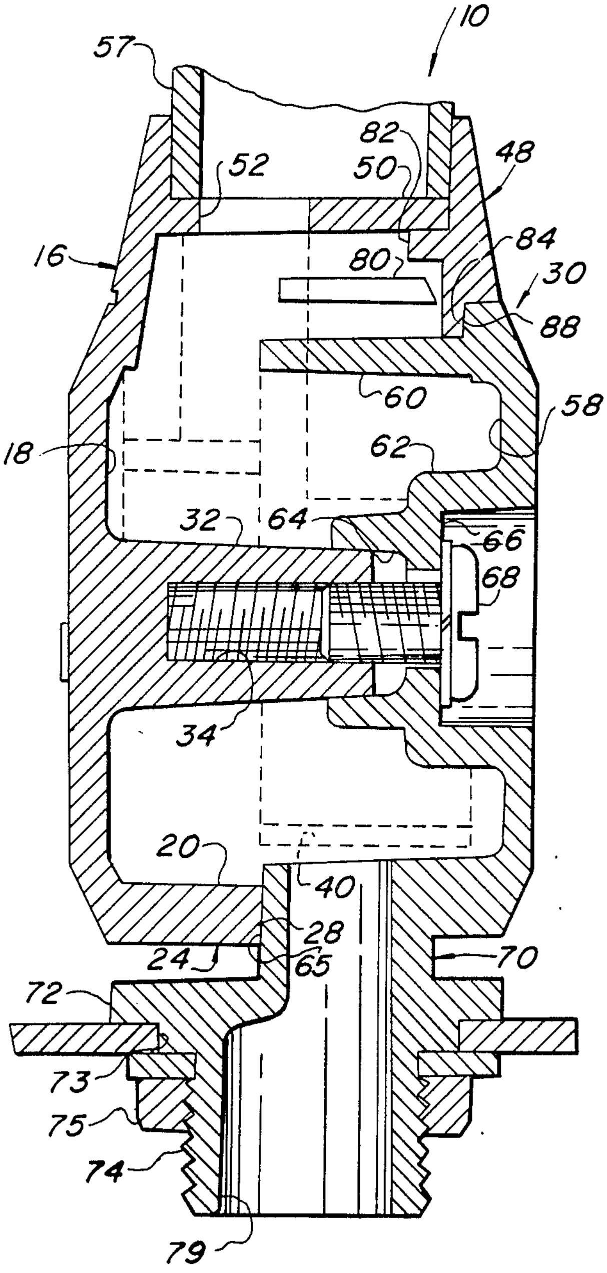
FIG. 6 is a longitudinal cross-sectional view of the assembled swivel taken along the line 6—6 of FIG. 2 showing details of construction.
Figure 7:
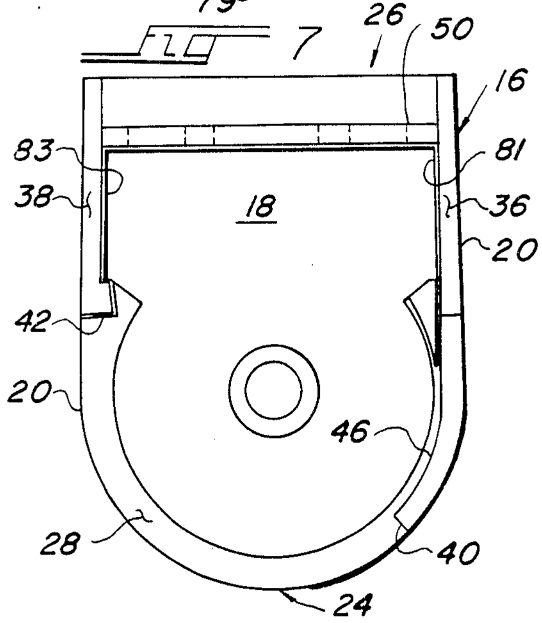
FIG. 7 is an elevational view of the body portion of the swivel as viewed from the interior side of the body showing details of construction.
Figure 8:
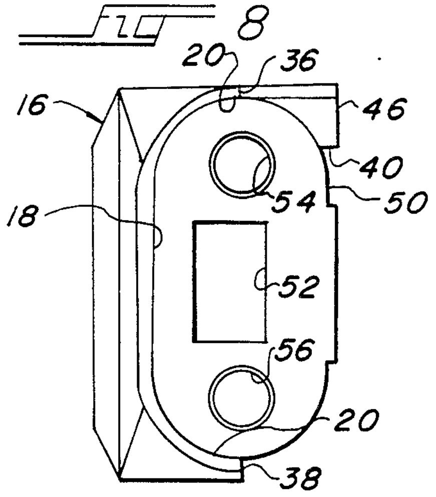
FIG. 8 is an elevational view of the body portion of the swivel as viewed from the mounting end of the body showing details of the transverse mounting wall.

Shown in FIG. 1 is a swivel assembly 10 employing the principals of the present invention. The swivel 10 is particularly adapted to mount to a track lighting fixture 12 and to a track adapter 14 of a track lighting system, however, the swivel can be used to mount other devices to other external mounting members, if desired, and the invention, although described in connection with lighting fixtures, is not to be considered limited to such use. As shown in FIGS. 6 and 7, the swivel 10 includes a body section 16 in the general shape of a scoop having a back wall 18 and a peripheral sidewall 20 extending perpendicularly from the back wall 18. One side of the body section at the free end of the peripheral sidewall is open. As best shown in FIG. 7, one end 24 of the body section is closed by the peripheral sidewall and the opposite end 26 is open. The closed end 24 is semicircularly shaped with the free end of the peripheral side wall along the semi-circular portion defining a bearing surface 28. The bearing surface can extend over an arc greater than semi-circular if desired, as shown in FIG. 7, but should be at least semi-circular so as to provide sufficient support and magnitude of rotation of a cap 30 which rotates on the bearing surface as set out hereinbelow.

Figure 3:
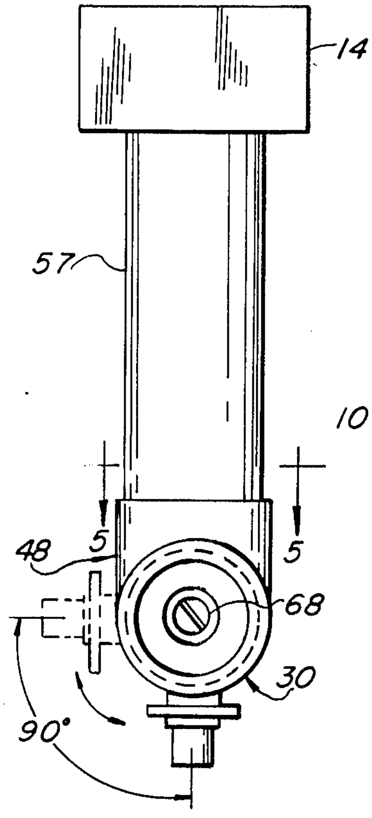
FIG. 3 is a front elevational view of the swivel of the present invention showing the preferred angle through which the swivel is pivotable.
Figure 4:
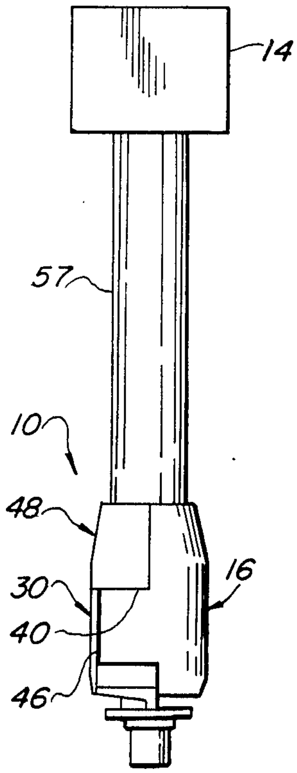
FIG. 4 is an elevational view of the swivel of the present invention taken from the side opposite that shown in FIG. 2 showing further details of construction and assembly.
Figure 5:
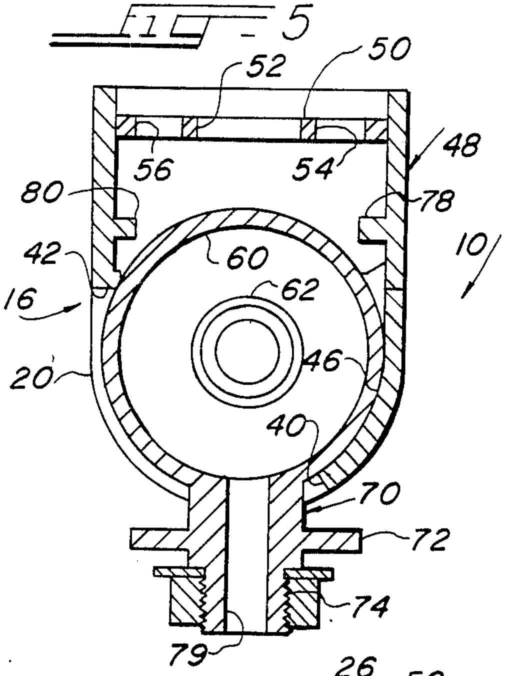
FIG. 5 is a longitudinal cross-sectional view of the assembled swivel taken along with the line 5—5 of FIG. 3 showing details of construction.

Referring to FIG. 6, a circular boss 32 in the form of a post extends from the back wall 18 of the body section, coaxial with the semi-circular end 24. The boss 32 includes a threaded hole 34. The bearing surface portion 28 is slightly recessed below opposing portions 36, 38 of the peripheral sidewall thereby forming two stops 40, 42 on the free end of the peripheral sidewall of the body. The first stop 40 is defined by an elongated curved flange-like tab 46 which extends outwardly from the free end of the peripheral sidewall. The stops are positioned to engage the cap 30 and function to limit the rotation of the cap to a predetermined range extending over an angle of at least 90° as shown in FIG. 3 and described below. The opposing surface portions 36, 38 of the free end of the body peripheral sidewall define a pair of mounting surfaces for a cover 48.

Positioned across the open end 26 of the body is a transverse wall 50 which is affixed to the inner surface of the back wall 18 and to the inner surfaces of opposing portions of the peripheral sidewall 20. The transverse wall 50 is provided with a clearance aperture 52 through which electrical leads can pass into the interior of the swivel. The transverse wall 50 is also provided with a pair of clearance holes 54, 56 through which threaded fasteners, not shown, can pass for attaching the body section to a desired external mounting member such as a hollow stem 57.

Figure 9:
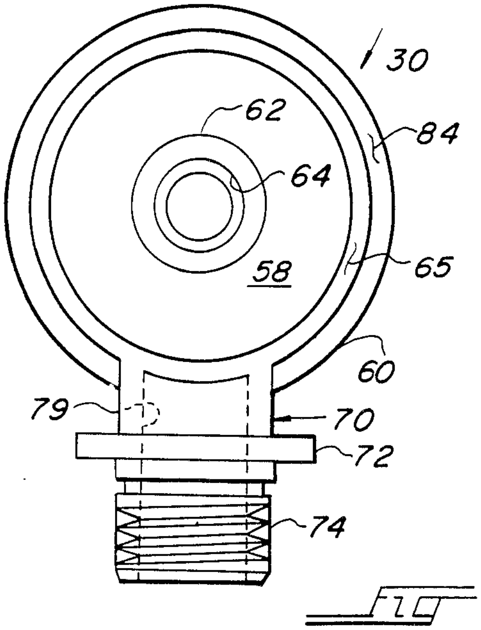
FIG. 9 is an elevational view of the cap portion of the swivel of the present invention as viewed from the interior side of the cap showing details of construction.

Now referring to FIGS. 6 and 9, the cap 30 is a cup-shaped member also having a back wall 58 and a circular sidewall 60 extending perpendicularly from the back wall 58. An upstanding boss 62 is cast into the inner surface of the back wall 58 coaxial with the circular sidewall 60, and a clearance hole 64 is provided through the boss 62. As shown best in FIG. 6, the post 32 on the body section is rotatably journaled in the clearance hole 64 providing for rotation of the cap relative to the body section. As previously set out, the bearing surface 28 receives and supports a portion 65 of the free end of the circular sidewall of the cap. The clearance hole 64 is counterbored at the outer surface of the back wall forming a shoulder 66 which receives the head of a threaded fastener 68 which passes through the hole 64 and threadedly engages the threaded hole 34. It can be seen that the cap is free to be rotated to selected positions between the limits of the stops by loosening the fastener 68 and is frictionally retained at the desired angular positions by tightening the fastener 68.

Figure 10:
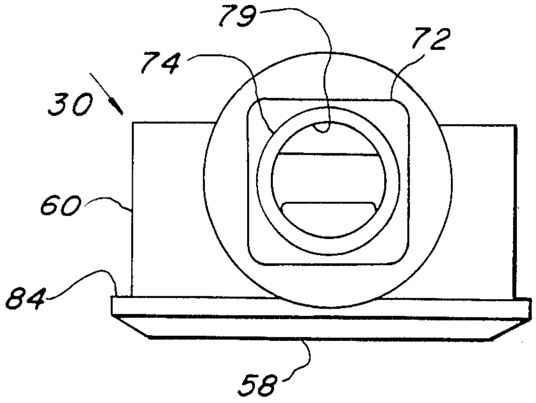
FIG. 10 is an elevational view of the cap portion of the swivel as viewed from the mounting end cap showing further details of construction.

As shown in FIGS. 6, 9 and 10, a mounting boss 70 extends from the circular sidewall 60 and includes a flange 72 for engaging the surface of the member to be mounted, in the embodiments shown being the light fixture 12, and an externally threaded portion 74 which is adapted to pass through a clearance hole 73 in the fixture and be engaged by a nut 75 so as to mount the fixture to the swivel. The mounting boss 70 is provided with an axial passage 76 providing for access to the interior of the swivel for the electrical leads.

In the case of a light fixture, it is preferable that the swivel provide for pivotable motion through an angle of at least 90° from horizontal when the swivel is mounted to a ceiling so as to provide for directing the light source perpendicularly at a wall or directly below the fixture perpendicularly to a floor. Therefore, the first stop 40 is positioned within the path of movement of the mounting boss 70 so as to engage the boss and limit the movement of the cap to a first position whereat the boss is orientated at approximately right angles to the external mounting member when installed. Similarly, the second stop 42 is positioned to engage the boss 70 and limit the movement of the cap to a second position orientated about 90° from the first position.

Figure 11:
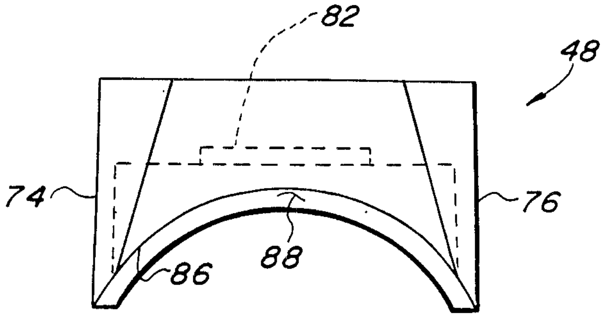
FIG. 11 is an elevational view of the cover portion of the swivel as viewed from the external side of the cover showing details of construction.
Figure 12:
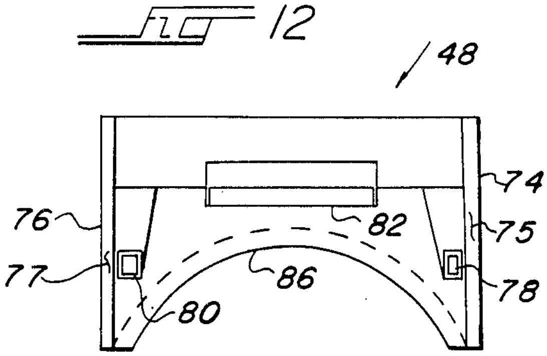
FIG. 12 is an elevational view of the cover as viewed from the interior side of the cover showing further details of construction.
Figure 13:
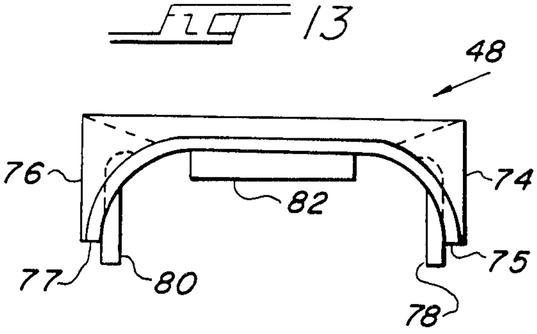
FIG. 13 is an elevational view of the cover portion of the swivel as viewed from the innermost end of the cover showing details of the cover retention tabs.

Now referring to FIGS. 11, 12 and 13, the cover 48 has a pair of opposing sides 74, 76 and is positioned over the open interior side of the body section adjacent the cap 30 with the ends 75, 77 of the cover sides 74, 79 mounted against the opposing mounting surface portions 36, 38 of the body peripheral sidewall 20. Two retention protuberances in the form of tabs 78, 80 are cast into the inner surface of each side 74, 76 of the cover and engage the inner surfaces 81, 83 of the peripheral sidewall of the body so as to retain the cover to the body. Additional retention of the cover to the body is achieved through a third retention protuberance in the form of a flange 82 on an inner surface of the cover which engages the transverse wall 50.

As shown in FIG. 10, the back wall 58 of the cap is slightly larger in diameter than the outside diameter of the circular side wall portion 60 forming a circumferential flange 84 on the cap at the back wall. The cover is provided with a curved edge 86 complementary to the circular sidewall 60 and includes a relief which forms a shoulder 88 along the curved edge. As shown in FIG. 6, with the cover mounted to the body over the open side, the circumferential flange 84 is received in the relief contiguous with the shoulder 88, thereby further retaining the cover to the body section.

Having described the preferred embodiment of the invention, those skilled in the art can readily devise other modifications and embodiments. Therefore, said other modifications and embodiments are to be considered to be incorporated into the scope of the appended claims.

I claim:

1. A swivel for mounting a lighting fixture or the like to an external mounting member comprising in combination:
   - a hollowing housing including a generally scooped-shaped mounting body having at least a semi-circular portion at one end and including a first back wall, a peripheral sidewall extending substantially perpendicularly from said first back wall along the periphery thereof defining an open side and an interior of said body, a circular boss extending perpendicularly from said first back wall coaxial with said semi-circular portion into said body member interior toward said body member open side, a circular cup-shaped cap including a second back wall, a circular side wall extending substantially perpendicularly from said second back wall defining an open side of said cap and an interior of said cap, a clearance hole in said second back wall coaxial with said circular sidewall, said first boss rotatably journaled in said clearance hole with the open side of said body member facing the open side of said cap;
   - a threaded fastener passing through said clearance hole and being threadedly received in a threaded hole in said first boss releasably securing said cap to said body member at selected angular positions; and
   - a cover removeably attached to said body member over said open side thereof adjacent said cap at an end of said body member opposite said semi-circular one end, said cover including an arcuate shaped edge contiguous with a portion of said circular side wall of said cap;
   - means for mounting said housing to said external mounting means; and
   - means for mounting said housing to said light fixture.

2. The swivel as defined in claim 1 wherein said means for mounting said swivel to said light fixture includes a mounting boss on said circular sidewall having a passage therethrough defining a first access opening into said hollow housing.

3. The swivel as defined in claim 2 wherein said cover and said mounting body define a second access opening into said hollow housing at the end of said mounting body opposite said semi-circular portion of said one end providing for passage of electrical leads from an electrical power supply through said first access opening in said boss, said hollowing housing and said second access opening to electrical components within said lighting fixture.

4. The swivel as defined in claim 3, wherein said means for mounting said swivel to said external mounting member comprises;
   - a transverse wall on said mounting body across said second access opening adjacent the end of said mounting body opposite said one end, said transverse wall including a clearance aperture therethrough into said hollow housing providing for passage of said electrical leads thereinto and including at least one clearance hole for receiving a fastener adapted to pass through said clearance hole and engage said external mounting member.

5. The swivel as defined in claim 4 wherein said transverse wall includes a pair of clearance holes on opposite sides of said clearance aperture.

6. The swivel as defined in claim 4 wherein said cover includes a wall portion and a pair of spaced apart opposing sides having free ends extending substantially perpendicularly from said wall portion at opposite ends thereof said opposing sides having the free ends thereof engaged against portions of said mounting body peripheral wall adjacent opposite ends of said transverse wall.

7. The swivel as defined in claim 6 wherein said cover further includes a pair of protuberances, one said protuberance affixed to an inner surface of each of said cover sides, each said protuberance engaged against an inner surface of said mounting body peripheral wall when said cover is mounted to said mounting body and a third protuberance on an inner surface of said cover wall portion engaged against said transverse wall when said cover is attached to said mounting body.

8. The swivel as defined in claim 7 wherein said cover wall portion includes said arcuate shaped edge and said arcuate shaped edge includes a relief defining a shoulder along said edge, said second back wall of said cap being circular and having a diameter greater than the outside diameter of said circular sidewall portion thereof defining a circumferential flange around said cap at said second back wall, said circumferential flange received in said relief contiguous with said shoulder.

9. The swivel as defined in claim 7 wherein said peripheral sidewall of said mounting body around said semi-circular portion includes a free end portion defining a bearing surface, said circular sidewall of said cap having a free end portion being contiguous with said bearing surface when said cap is mounted to said mounting body.

10. The swivel as defined in claim 3 wherein said cap is pivotable relative to said mounting body to said selected angular positions through an angle of at least 90°.

11. The swivel as defined in claim 10 further comprising:
   - first stop means for limiting said pivotable movement of said cap in one direction to a first position whereat said mounting boss is orientated as substantially a right angle relative to said second access opening into said swivel; and
   - second stop means for limiting the pivotable movement of said cap in a direction opposite to said one direction to substantially 90° from said first position.

12. The swivel as defined in claim 11 wherein said first stop means includes a flange extending from said peripheral sidewall of said mounting body into the path of movement of said boss and having an end located to engage said boss and stop movement thereof at said first position, said second stop means includes a raised portion on the free end of said peripheral sidewall of said mounting body defining a shoulder thereon located to engage said boss and stop movement thereof at said second position.

13. A swivel for mounting a light fixture or the like to an external mounting member comprising:

a hollow housing including a body section having a closed back, an open side and a peripheral sidewall extending substantially perpendicularly from said back toward said open side, said peripheral sidewall having a free end at said open side, a portion of said peripheral sidewall being at least semi-circular defining a semi-circular closed end having a bearing surface on said free end of peripheral sidewall along said semi-circular portion thereof, a circular boss extending from said back coaxial with said semicircular end including a threaded hole coaxial with said boss; a cup-shaped cap having a closed side, a circular sidewall extending perpendicular from said closed side defining an annular free surface at an end of said circular sidewall opposite said closed side, said closed side including a circular clearance hole coaxial with said circular side wall, said boss rotatably journaled in said clearance hole with a portion of said free annular surface being contiguous with said bearing surface on said peripheral sidewall;

a threaded fastener passing through said clearance hole engaged in said threaded hole providing for releasable retention of said cap to said body at selected relative angular positions;

a cover removeably mounted over said open side of said body including a pair of opposing sides mounted to the free end of said peripheral sidewall along opposing portions thereof adjacent said bearing surface, said body, said cap and said cover defining a hollow interior;

means for mounting said housing to said external mounting member including first means providing for passage of electrical leads between an external power supply associated with said external mounting member and said hollow interior; and means for mounting said housing to said light fixture including second means providing for passage of said electrical leads between said hollow interior and said lighting fixture.

14. The swivel as defined in claim 13 wherein said cover includes an arcuate shaped edge having a curvature complementary to said circular sidewall and including a relief defining a shoulder along said edge, a circumferential flange around said cap at the closed side received in said relief against said shoulder providing for retention of said cover to said body member.

15. The swivel as defined in claim 14 further including a pair of tabs on an inner surface of said cover opposing sides engaging an inner surface of opposing portions of said peripheral sidewall providing for additional retention of said cover to said body.

16. The swivel as defined in claim 13 wherein said means for mounting said swivel to said external mounting member comprises:

a transverse wall between said body member and said cover including at least one clearance hole adapted to receive a threaded fastener and a clearance aperture through said transverse wall adapted to allow said electrical leads to pass therethrough.

17. The swivel is defined in claim 13 wherein said means for mounting said housing to said light fixture comprises:

an externally threaded boss on the circular sidewall of said cap including a passage therethrough sized to receive said electrical leads.

18. The swivel as defined in claim 16 wherein said transverse wall is mounted to the inner surface of said body member back and said cover includes a wall portion having a protuberance on an inner surface thereof engaged to said transverse wall providing for retention of said cover to said transverse wall.

19. A swivel assembly for mounting a light fixture to an external mounting member comprising:

a body section including means for attachment to said external mounting member defining a hollow member open on one side said open side being semi-circular shaped at one end of said body section;

a cap including means for mounting to the light fixture defining a hollow circular cupshaped member having an open end rotatably journaled to said body section with said cup open end facing and covering a portion of said body section open side at the semi-circular end thereof;

a cover removeably attached to said body over the open side of said body section adjacent said cap, whereby a hollow housing is defined;

means associated with said means for attachment to said external member providing for access of electrical leads from an external power supply to the interior of said hollow housing; and means associated with said means for attachment to said light fixture providing for access of said electrical leads to said light fixture from the interior of said hollow housing.

* * * * *